(12) United States Patent
Ishi

(10) Patent No.: US 10,005,143 B2
(45) Date of Patent: Jun. 26, 2018

(54) CUTTING INSERT, CUTTING TOOL, AND METHOD OF PRODUCING MACHINED PRODUCT

(71) Applicant: KYOCERA Corporation, Kyoto-shi, Kyoto (JP)

(72) Inventor: Hirohisa Ishi, Omihachiman (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 41 days.

(21) Appl. No.: 15/105,875

(22) PCT Filed: Dec. 12, 2014

(86) PCT No.: PCT/JP2014/082999
§ 371 (c)(1),
(2) Date: Jun. 17, 2016

(87) PCT Pub. No.: WO2015/093408
PCT Pub. Date: Jun. 25, 2015

(65) Prior Publication Data
US 2017/0036278 A1    Feb. 9, 2017

(30) Foreign Application Priority Data

Dec. 18, 2013   (JP) .................................. 2013-261336

(51) Int. Cl.
*B23C 5/20* (2006.01)
*B23C 5/22* (2006.01)
*B23C 5/10* (2006.01)

(52) U.S. Cl.
CPC .............. *B23C 5/207* (2013.01); *B23C 5/109* (2013.01); *B23C 5/202* (2013.01);
(Continued)

(58) Field of Classification Search
CPC ......... B23C 5/207; B23C 5/202; B23C 5/109; B23C 2200/361; B23C 2200/0416;
(Continued)

(56) References Cited

U.S. PATENT DOCUMENTS 3,226,797 A * 1/1966 Hertel ................. B23B 27/1614
407/101
4,182,587 A * 1/1980 Striegl .................... B23C 5/109
407/113
(Continued)

FOREIGN PATENT DOCUMENTS

EP          0308874 A2      3/1989
EP          1749602 A2 *    2/2007    ............. B23C 5/202
(Continued)

OTHER PUBLICATIONS

Description WO 03022495 obtained at https://worldwide.espacenet.com/ (last visited Apr. 12, 2017).*
(Continued)

*Primary Examiner* — Ryan Rufo
(74) *Attorney, Agent, or Firm* — Volpe and Koenig, P.C.

(57) ABSTRACT

A cutting insert according to one embodiment includes upper and lower surfaces, a side surface including a front side surface, a rear side surface, and a pair of horizontal side surfaces, a first cutting edge, a second cutting edge, and a through hole extending from the upper surface to the lower surface. An opening of the through hole on a side of the upper surface is provided closer to a ridge line where the upper surface and the front side surface intersect each other than a ridge line where the upper surface and the rear side surface intersect each other. An opening of the through hole on a side of the lower surface is provided closer to a ridge line where the lower surface and the rear side surface
(Continued)

intersect each other than a ridge line where the lower surface and the front side surface intersect each other.

12 Claims, 14 Drawing Sheets

(52) U.S. Cl.
CPC ............... *B23C 2200/0416* (2013.01); *B23C 2200/0494* (2013.01); *B23C 2200/085* (2013.01); *B23C 2200/164* (2013.01); *B23C 2200/361* (2013.01)

(58) Field of Classification Search
CPC ...... B23C 2200/0494; B23C 2200/128; B23C 2200/367; B23C 2200/121
See application file for complete search history.

(56) References Cited

U.S. PATENT DOCUMENTS

| | | | | |
|---|---|---|---|---|
| 2008/0025803 A1* | 1/2008 | Hecht | ................. | B23B 27/08 407/42 |
| 2009/0092451 A1 | 4/2009 | Harif | | |
| 2009/0245953 A1* | 10/2009 | Kramer | ................. | B23C 5/06 407/113 |
| 2010/0111621 A1 | 5/2010 | Harif | | |
| 2013/0039705 A1* | 2/2013 | Fang | ................. | B23C 5/109 407/42 |
| 2013/0136547 A1 | 5/2013 | Kurokawa et al. | | |

FOREIGN PATENT DOCUMENTS

| | | |
|---|---|---|
| EP | 2514559 A2 | 10/2012 |
| EP | 2514560 A2 | 10/2012 |
| EP | 2167260 B1 | 6/2013 |
| JP | 2010-094747 A | 4/2010 |
| WO | 03/022495 A1 | 3/2003 |
| WO | 2008/149371 A1 | 12/2008 |
| WO | 2012/114848 A1 | 8/2012 |

OTHER PUBLICATIONS

International Search Report, PCT/JP2014/082999, dated Feb. 27, 2015, 2 pgs.

* cited by examiner

CUTTING INSERT, CUTTING TOOL, AND METHOD OF PRODUCING MACHINED PRODUCT

TECHNICAL FIELD

The present embodiment relates to a cutting insert, a cutting tool, and a method of producing a machined product.

BACKGROUND ART

As a cutting tool used in a cutting process for a workpiece such as a metal, a tool described in JP 2010-94747 A (Patent Document 1) is known, for example. An insert used in the cutting tool described in Patent Document 1 includes an upper surface, a lower surface having a flank surface, a side surface having a rake surface, a cutting edge formed on a ridge line where the lower surface and the side surface intersect each other, and a screw insertion hole (through hole) extending from the upper surface to the lower surface. The insert is fixed to a tool body (holder) by inserting a clamp screw into the screw insertion hole.

In recent years, there is a demand for a cutting tool having a small machining diameter. For this reason, it is necessary to miniaturize an insert. In order to reduce a size of an insert, a through hole should be reduced in size, or a distance between a through hole and a cutting edge should be narrowed. However, in a case where a through hole is reduced in size, a screw is made thinner, so that fixing of a cutting insert to a holder may be unstable. Also, in a case where a distance between a through hole and a cutting edge to which a force is applied at a time of cutting is narrowed, strength of a cutting insert may be degraded.

SUMMARY OF THE INVENTION

A cutting insert according to one embodiment has: an upper surface having a substantially rectangular shape; a lower surface having a substantially rectangular shape; a side surface which is located between the upper surface and the lower surface, and has a front side surface, a rear side surface, and a pair of horizontal side surfaces; a first cutting edge formed on a ridge line where the lower surface and the front side surface intersect each other; a second cutting edge formed on a ridge line where the upper surface and the rear side surface intersect each other; and a through hole extending from the upper surface to the lower surface. An opening of the through hole on a side of the upper surface is provided closer to a ridge line where the upper surface and the front side surface intersect each other than a ridge line where the upper surface and the rear side surface intersect each other. Also, an opening of the through hole on a side of the lower surface is provided closer to a ridge line where the lower surface and the rear side surface intersect each other than a ridge line where the lower surface and the front side surface intersect each other.

EMBODIMENT FOR CARRYING OUT THE INVENTION

<Cutting Insert>

Figure 1:
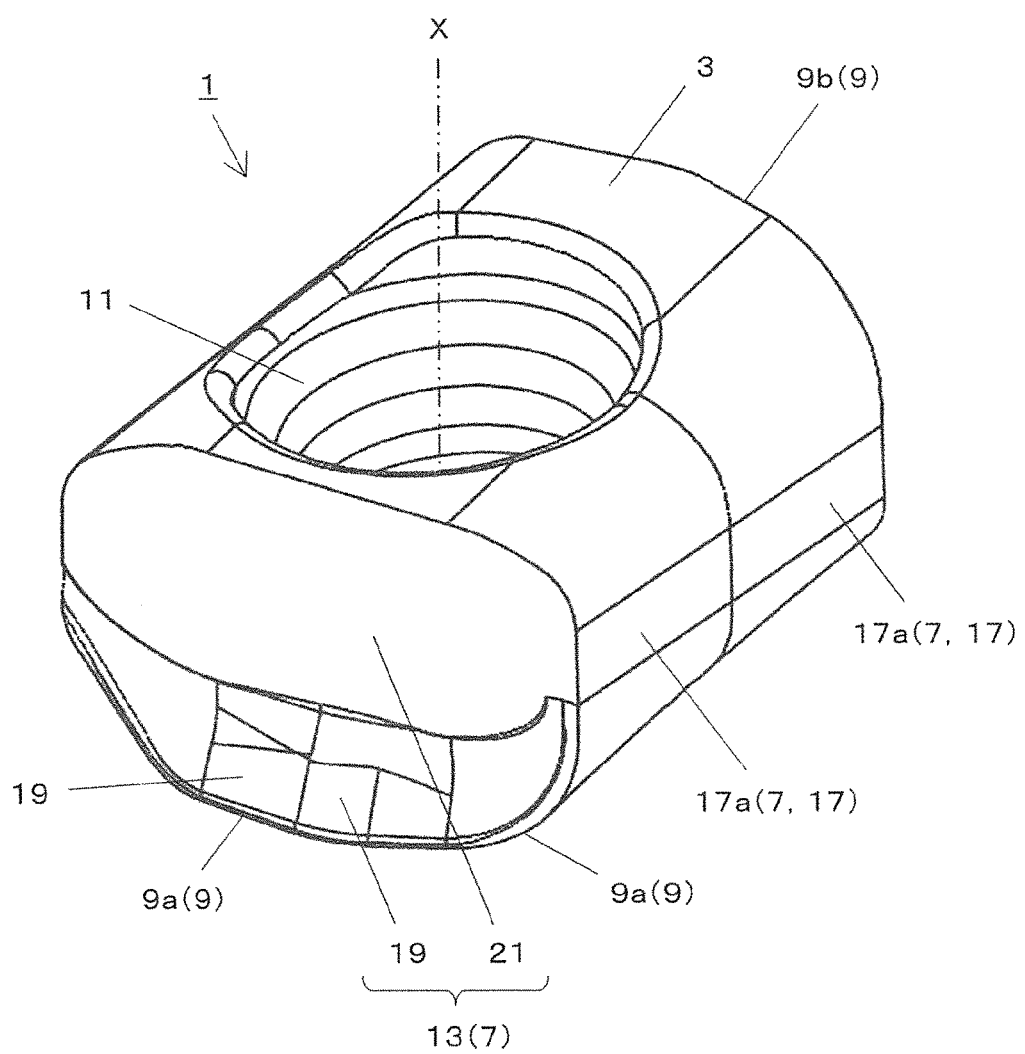
FIG. 1 is a perspective view showing a cutting insert according to a first embodiment of the present invention.

A cutting insert according to one embodiment will be described in detail with reference to accompanying drawings. However, for convenience of explanation, each of drawings which will be below referred to schematically shows only principal elements necessary for describing the present embodiment. Accordingly, a cutting insert according to the present invention can include arbitrary structural elements which are not shown in the drawings referred to in this description. Also, dimensions of elements in the drawings do not exactly represent dimensions of actual structural elements, dimension ratios of elements, and the like.

A cutting insert 1 (which will also be simply referred to as an "insert 1") according to the present embodiment includes an upper surface 3, a lower surface 5, a side surface 7, a cutting edge 9 and a through hole 11. Examples of a material for the insert 1 include cemented carbide and cermet. Examples of a composition of cemented carbide include WC—Co which is generated by sintering a mixture of tungsten carbide (WC) and cobalt (Co) powders, WC—TiC—Co which is obtained by adding titanium carbide (TiC) to WC—Co, and WC—TiC—TaC—Co which is obtained by adding tantalum carbide (TaC) to WC—TiC—Co. In addition, cermet is a sintered composite material which is obtained by combining a ceramic component with a metal, and a specific example thereof includes a titanium compound which mainly includes titanium carbide (TiC) or titanium nitride (TiN).

A surface of the insert 1 may be coated with a membrane by using a chemical vapor deposition (CVD) method or a physical vapor deposition (PVD) method. Examples of a composition of a membrane include titanium carbide (TiC), titanium nitride (TiN), titanium carbonitride (TiCN), and alumina ($Al_2O_3$).

Each of the upper surface 3 and the lower surface 5 has a substantially rectangular shape. It is noted that a substantially rectangular shape does not mean a rectangular shape in a strict sense. For example, although the upper surface 3 according to the present embodiment includes four angled areas, each of those angled areas is not angled in a strict sense, and has a rounded shape in a top view. Also, a side part which is located so as to connect adjacent angled areas does not have a linear shape in a strict sense, and has a shape which locally protrudes outward.

The lower surface 5 according to the present embodiment has the same shape as the upper surface 3. Thus, although the lower surface 5 has four angled areas like the upper surface 3, each of those angled areas has a rounded shape in a bottom view. Also, a side part which is located so as to connect adjacent angled areas has a shape which locally protrudes outward. The lower surface 5 is a surface located on a side opposite to the upper surface 3. One of the upper surface 3 and the lower surface 5 functions as one contact surface which comes into contact with an insert pocket when the insert 1 is attached to a holder.

The side surface 7 is located between the upper surface 3 and the lower surface 5. The side surface 7 according to the present embodiment has four surface areas of a front side surface 13, a rear side surface 15, and a pair of horizontal side surfaces 17 which respectively correspond to four side parts of each of the upper surface 3 and the lower surface 5. In the following description, one of the pair of horizontal side surfaces 17 will be referred to as a first horizontal side surface 17a and the other of the pair of horizontal side surfaces 17 will be referred to as a second horizontal side surface 17b.

The insert 1 according to the present embodiment is attached to a holder in such a manner that the first horizontal side surface 17a of the pair of the horizontal side surfaces 17 is located on a side of an outer periphery and the second horizontal side surface 17b of the pair of the horizontal side surfaces 17 is located on a side of an inner periphery. When the insert 1 according to the present embodiment is attached to a holder, not only one of the upper surface 3 and the lower surface 5, but also two surfaces including the front side surface 13 or the rear side surface 15 and the second horizontal side surface 17b function as contact surfaces which come into contact with an insert pocket.

In each of the upper surface 3, the lower surface 5, and the second horizontal side surface 17b, at least apart is a flat surface. A ridge line does not need to be formed on all of boundaries of the upper surface 3, the lower surface 5 and the side surface 7. Each of a boundary between the lower surface 5 and the front side surface 13 and a boundary between the upper surface 3 and the rear side surface 15, on which the cutting edges 9 are formed, takes a linear shape, to form a ridge line. However, on a boundary between each of the pair of horizontal side surfaces 17 and the upper surface 3 and on a boundary between each of the pair of horizontal side surfaces 17 and the lower surface 5, where the cutting edges 9 are not formed, a gently curved area is formed.

Although a size of an insert is not limited to any particular value, a maximum value of a width from the front side surface 13 to the rear side surface 15 in a top view is set to be in a range of approximately 10 to 20 mm in the insert 1 according to the present embodiment, for example. Also, a maximum value of a width from one of the pair of horizontal side surfaces 17 to the other in a top view is set to be in a range of approximately 10 to 20 mm. Further, a maximum value of a height from the lower surface 5 to the upper surface 3 is in a range of approximately 5 to 10 mm. It is noted that a maximum value of a height from the lower surface 5 to the upper surface 3 means a width between a top end of the upper surface 3 and a bottom end of the lower surface 5, which extends in a direction orthogonal to the upper surface 3 and the lower surface 5.

The cutting edge 9 in the insert 1 according to the present embodiment has a first cutting edge 9a and a second cutting edge 9b. The first cutting edge 9a is formed on a ridge line where the lower surface 5 and the front side surface 13 intersect each other. Also, the second cutting edge 9b is formed on a ridge line where the upper surface 3 and the rear side surface 15 intersect each other. The first cutting edge 9a and the second cutting edge 9b are used for cutting a workpiece in a cutting process. However, the first cutting edge 9a and the second cutting edge 9b are not used at the same time in a cutting process, and one of the first cutting edge 9a and the second cutting edge 9b is used in each cutting process.

The first cutting edge 9a and the second cutting edge 9b do not need to have a linear shape. Each of the first cutting edge 9a and the second cutting edge 9b has a plurality of linear parts and a curved part connecting the linear parts so that each of the first cutting edge 9a and the second cutting edge 9b has an outwardly-convex shape in a top view.

In such a case as described above where each of the first cutting edge 9a and the second cutting edge 9b has a convex shape, it is unlikely that all parts of the first cutting edge 9a or all parts of the second cutting edge 9b come into contact with a workpiece at the same time at a moment when the first cutting edge 9a or the second cutting edge 9b starts to bite the workpiece. Thus, it is unlikely to apply an excessively great force to the cutting edge 9.

Although the cutting edge 9 according to the present embodiment has only the first cutting edge 9a and the second cutting edge 9b, a cutting edge is not limited to such a configuration. For example, while the first cutting edge 9a is formed on a ridge line where the lower surface 5 and the front side surface 13 intersect each other, a third cutting edge (not shown in the drawings) may be formed on a ridge line where the front side surface 13 and the first horizontal side surface 17a intersect each other. In addition, a fourth cutting edge (not shown in the drawings) may be formed on a ridge line where the rear side surface 15 and the first horizontal side surface 17a intersect each other.

The insert 1 according to the present embodiment has the through hole 11 extending from the upper surface 3 to the lower surface 5. The through hole 11 is provided in order to insert a screw when the insert 1 is screwed and fixed to a holder of a cutting tool.

Although generally, the through hole 11 is configured so as to extend from a center of the upper surface 3 toward a center of the lower surface 5, the through hole 11 according to the present embodiment is different from such a configuration. More specifically, an opening of the through hole 11 on a side of the upper surface 3 is provided closer to a ridge line where the upper surface 3 and the front side surface 13 intersect each other than a ridge line where the upper surface 3 and the rear side surface 15 intersect each other. For example, referring to FIG. 2, in the upper surface 3, while a ridge line intersecting the rear side surface 15 is located on a right-hand side and a ridge line intersecting the front side surface 13 is located on a left-hand side, an opening on a side of the upper surface 3 is located being displaced leftward in the upper surface 3.

Figure 2:
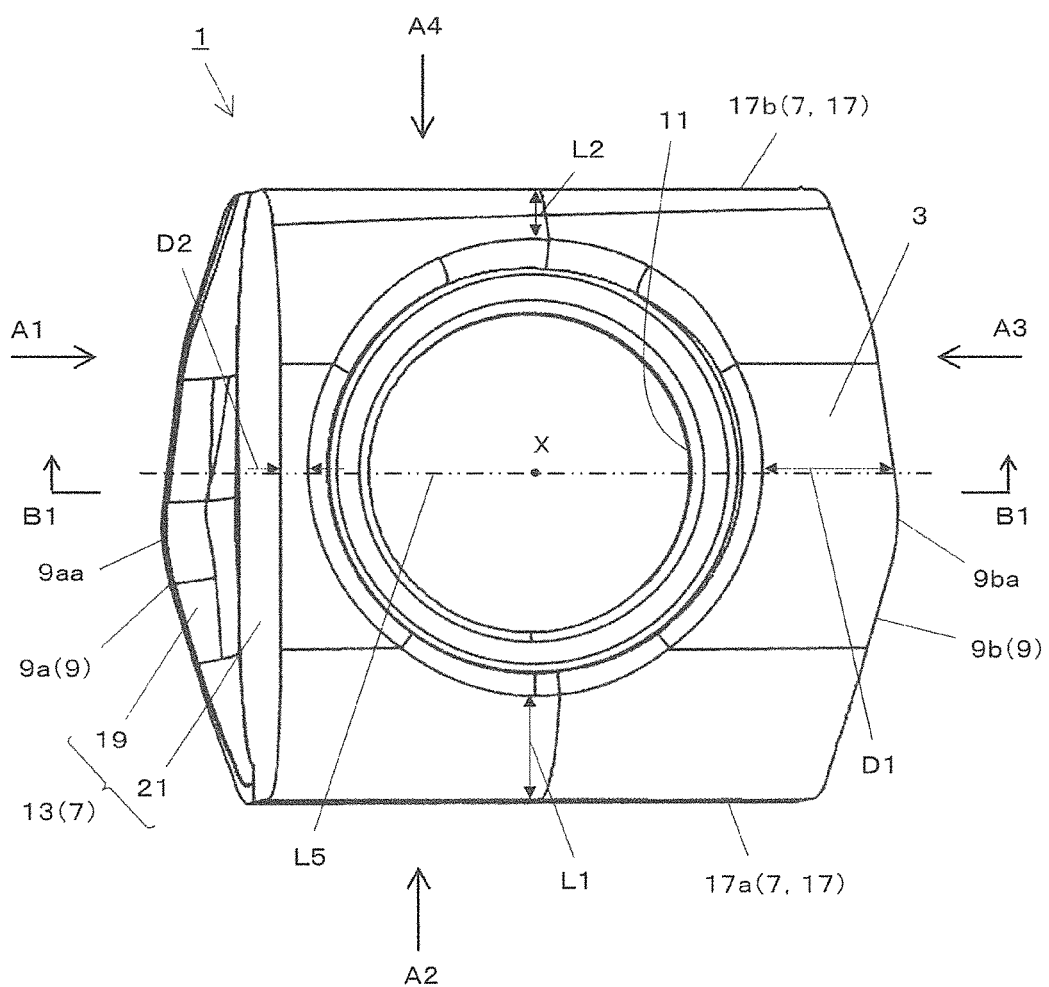
FIG. 2 is a top view of the cutting insert shown in FIG. 1.
Figure 8:
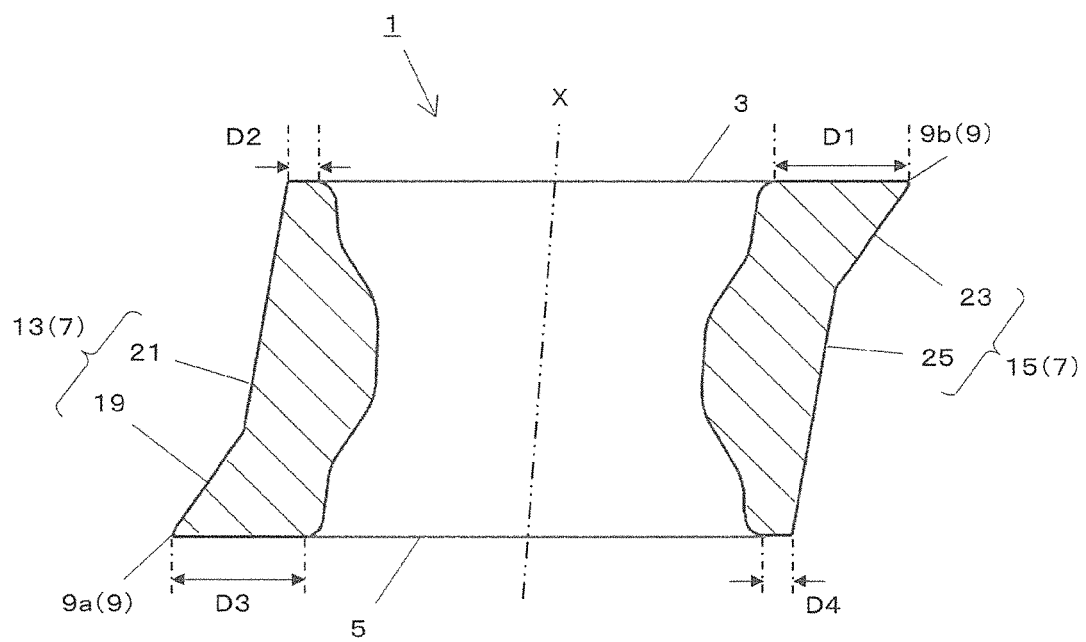
FIG. 8 is a sectional view of a section B1-B1 of the cutting insert shown in FIG. 2.

Thus, as shown in FIG. 2 and FIG. 8, a distance D2 between an opening of the through hole 11 on a side of the upper surface 3 and a ridge line intersecting the front side surface 13 in the upper surface 3 is smaller than a distance D1 between an opening of the through hole 11 on a side of the upper surface 3 and a ridge line intersecting the rear side surface 15 in the upper surface 3.

An opening of the through hole 11 on a side of the lower surface 5 is provided closer to a ridge line where the lower surface 5 and the rear side surface 15 intersect each other than a ridge line where the lower surface 5 and the front side surface 13 intersect each other. For example, referring to FIG. 3, in the lower surface 5, while a ridge line intersecting the rear side surface 15 is located on a right-hand side and a ridge line intersecting the front side surface 13 is located on a left-hand side, an opening on a side of the lower surface 5 is located being displaced rightward in the upper surface 3.

Figure 3:
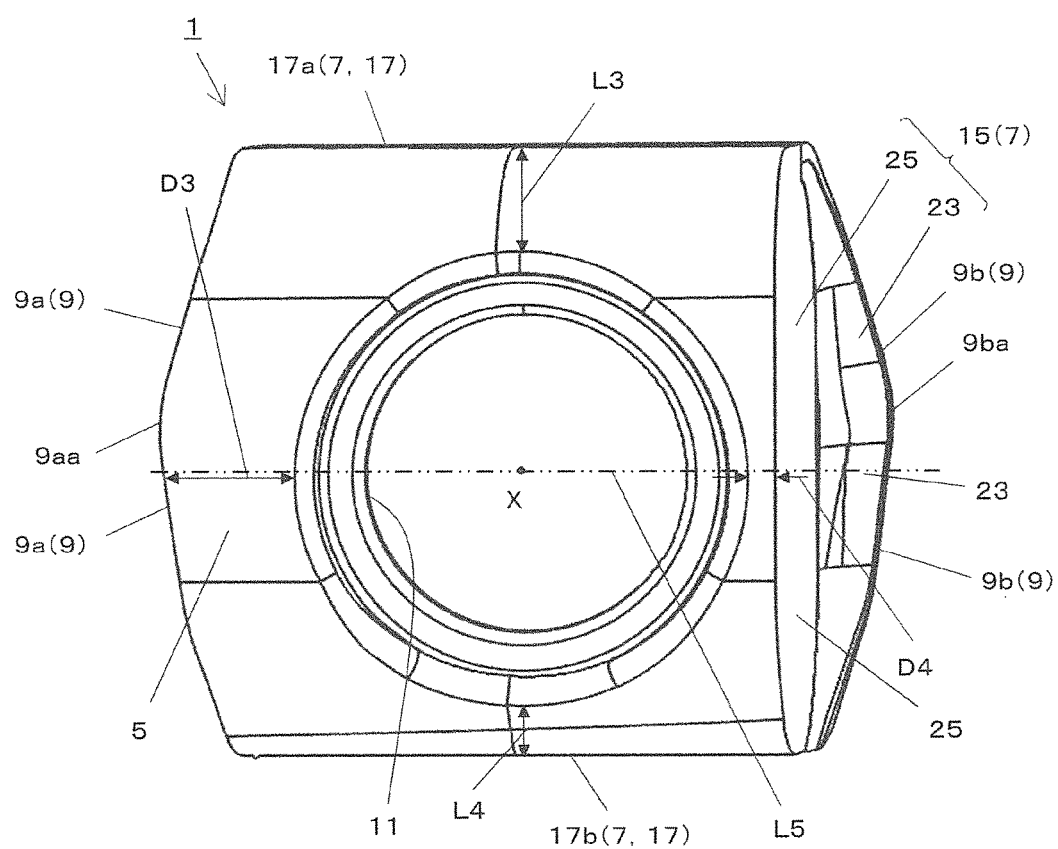
FIG. 3 is a bottom view of the cutting insert show in FIG. 1.
Figure 4:
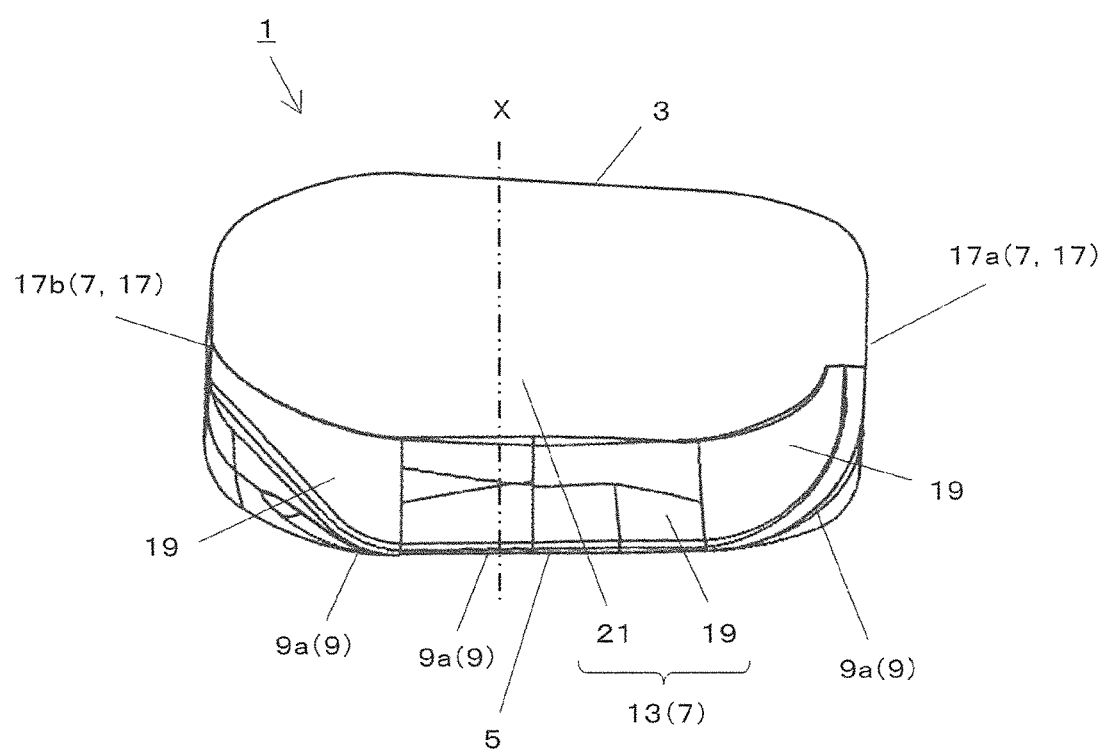
FIG. 4 is a side view of the cutting insert as seen from a direction A1 shown in FIG. 2.

Thus, as shown in FIG. 3 and FIG. 8, a distance D4 between an opening of the through hole 11 on a side of the lower surface 5 and a ridge line intersecting the rear side surface 15 in the lower surface 5 is smaller than a distance D3 between an opening of the through hole 11 on a side of the lower surface 5 and a ridge line intersecting the front side surface 13 in the lower surface 5.

While the second cutting edge 9b is formed on a ridge line where the upper surface 3 and the rear side surface 15 intersect each other, no cutting edge is formed on a ridge line where the upper surface 3 and the front side surface 13 intersect each other. Since an opening of the through hole 11 on a side of the upper surface 3 is configured in the above-described manner, it is possible to widen a distance between an opening of the through hole 11 on a side of the upper surface 3 and the second cutting edge 9b without reducing a size of the through hole 11 to an excessive degree.

In addition, while the first cutting edge 9a is formed on a ridge line where the lower surface 5 and the front side surface 13 intersect each other, no cutting edge is formed on a ridge line where the lower surface 5 and the rear side surface 15 intersect each other. Since an opening of the through hole 11 on a side of the lower surface 5 is configured in the above-described manner, it is possible to widen a distance between an opening of the through hole 11 on a side of the lower surface 5 and the first cutting edge 9a without reducing a size of the through hole 11 to an excessive degree.

As a result of this, it is possible to keep strength of the insert 1 high without reducing a size of the through hole 11 to an excessive degree in both of a case where the first cutting edge 9a is used and a case where the second cutting edge 9b is used. Therefore, even in a case where a cutting tool is miniaturized, the cutting insert 1 can be stably used.

In the insert 1 according to the present embodiment, a center axis X of the through hole 11 is tilted with respect to the upper surface 3 in a side view as seen from the horizontal side surface 17. More specifically, a part thereof on a side of the upper surface 3 is inclined so as to approach the rear side surface 15. As shown in FIG. 8, the same evaluation results are provided also in a cross sectional view. In the insert 1 according to the present embodiment, the lower surface 5 is parallel to the upper surface 3, so that the center axis X of the through hole 11 is tilted also with respect to the lower surface 5.

The center axis X of the through hole 11 is tilted with respect to the upper surface 3 as described above, so that it is possible to easily widen a distance between an opening of the through hole 11 and each of the first cutting edge 9a and the second cutting edge 9b without reducing a size of the through hole 11 to an excessive degree. A tilt angle of the center axis X of the through hole 11 with respect to the upper surface 3, which is not limited to any particular value, is set to be in a range of approximately 80 to 89°, for example.

Moreover, in a case where a cutting edge is formed also on both of a ridge line where an upper surface and a front side surface intersect each other and a ridge line where a lower surface and a rear side surface intersect each other as in a conventional insert, when a center axis of a through hole is tilted with respect to the upper surface, the insert cannot be appropriately attached to a holder in an attempt to use the ridge lines as cutting edges. However, in the insert 1 according to the present embodiment, no cutting edge is ever formed on such the ridge lines, so that no particular problem would be caused.

The center axis X of the through hole 11, which is tilted with respect to the upper surface 3 and the lower surface 5, is parallel to the pair of horizontal side surfaces 17. When the through hole 11 is tilted with respect to the pair of horizontal side surfaces 17, a distance between each of the pair of horizontal side surfaces 17 and the through hole 11 becomes non-uniform. Thus, an area where a distance between each of the pair of horizontal side surfaces 17 and the through hole 11 is extremely small may possibly be generated.

However, in a case where the through hole 11 is parallel to the pair of horizontal side surfaces 17, a distance between the through hole and the side surface is almost uniform and does not substantially changes, so that a part which is weak in strength is unlikely to be provided between the through hole 11 and each of the horizontal side surfaces 17. Thus, the insert 1 can be stably brought into contact with a holder. In particular, the second horizontal side surface 17b, which functions as a contact surface in the insert 1 according to the present embodiment, can be stably used as a contact surface. It is noted that being parallel in this description does not require being precisely parallel and such is a concept including also a state in which an object is tilted very slightly at an angle of approximately 0.5°.

While the second horizontal side surface 17b functions as a contact surface, the first horizontal side surface 17a is located on a side of an outer periphery of a holder when the insert 1 according to the present embodiment is attached to the holder. In carrying out a cutting process using the first cutting edge 9a or the second cutting edge 9b, a relatively great cutting resistance is more likely to be applied to a part located on a side of an outer periphery than a part located on aside of an inner periphery in each of those cutting edges 9. Thus, a great load is more likely to be applied to the first horizontal side surface 17a near the part located on a side of an outer periphery in each of the cutting edges 9 than the second horizontal side surface 17b near the part located on a side of an inner periphery in each of the cutting edges 9.

However, in the insert 1 according to the present embodiment, as shown in FIG. 2, a width L1 between the first horizontal side surface 17a which is one of the pair of horizontal side surfaces 17 and an opening of the through hole 11 on a side of the upper surface 3 is larger than a width L2 between the second horizontal side surface 17b which is the other of the pair of horizontal side surfaces 17 and an opening of the through hole 11 on a side of the upper surface 3 in a top view. Accordingly, it is possible to enhance strength of a side of the first horizontal side surface 17a in the insert 1.

Also, in the insert 1 according to the present embodiment, as shown in FIG. 3, for the same reasons as described above, a width L3 between the first horizontal side surface 17a and an opening of the through hole 11 on a side of the lower surface 5 is larger than a width L4 between the second horizontal side surface 17b which is the other of the pair of horizontal side surfaces 17 and an opening of the through hole 11 on a side of the lower surface 5 in a bottom view.

While it has already been described that each of the first cutting edge 9a and the second cutting edge 9b has an outwardly-convex shape in a top view, each of the first cutting edge 9a and the second cutting edge 9b according to the present embodiment has another distinctive configuration as follows.

Figure 5:
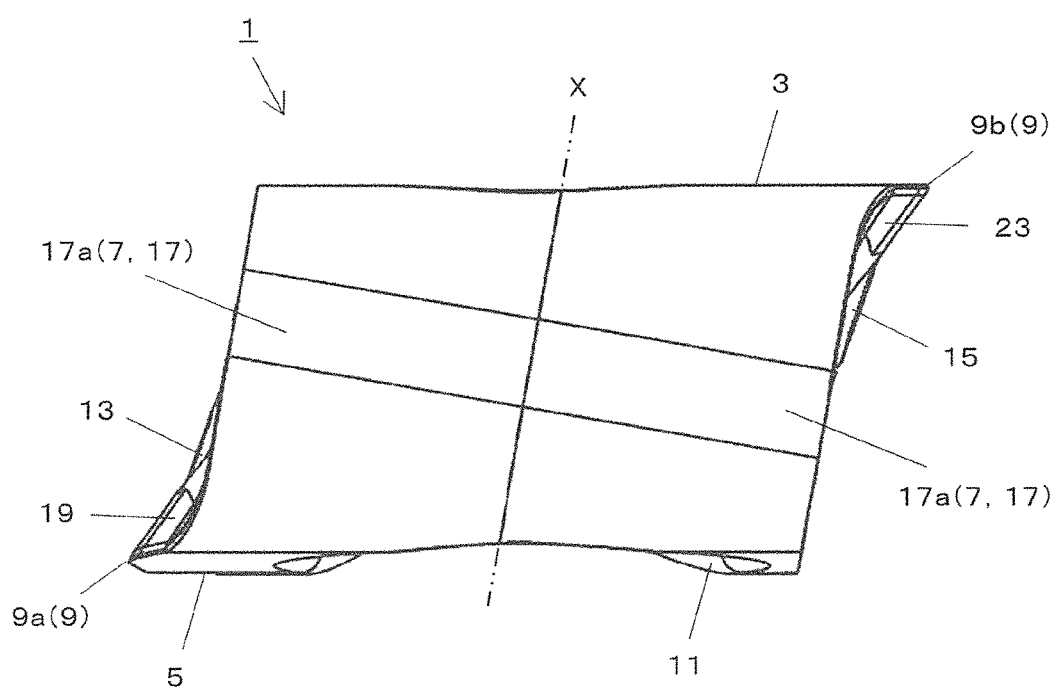
FIG. 5 is a side view of the cutting insert as seen from a direction A2 shown in FIG. 2.
Figure 6:
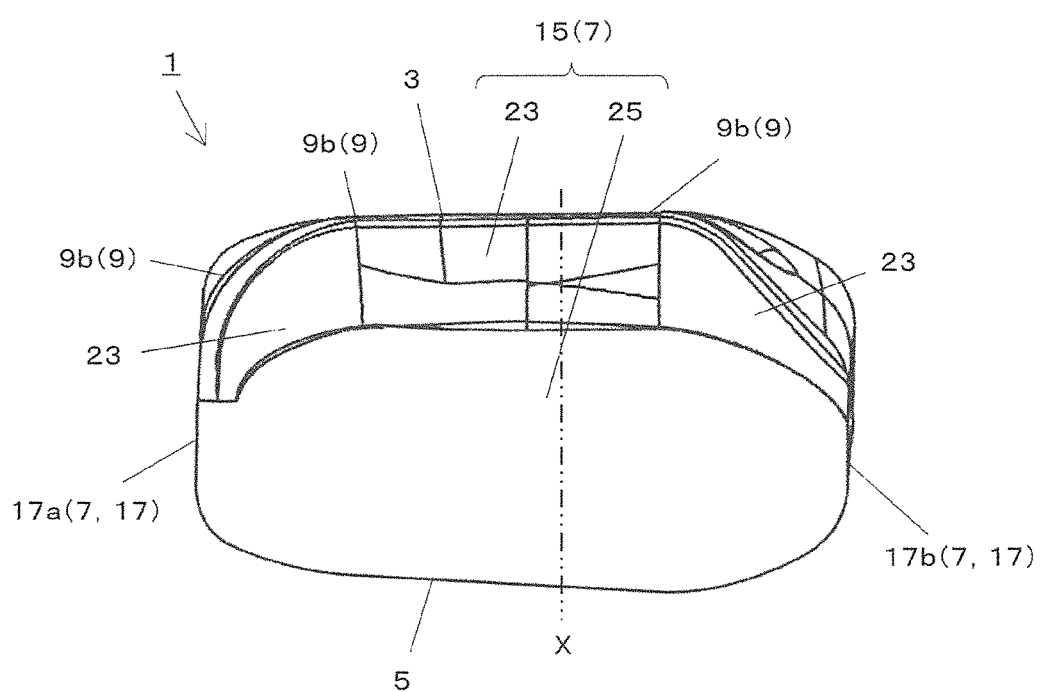
FIG. 6 is a side view of the cutting insert as seen from a direction A3 in FIG. 2.
Figure 7:
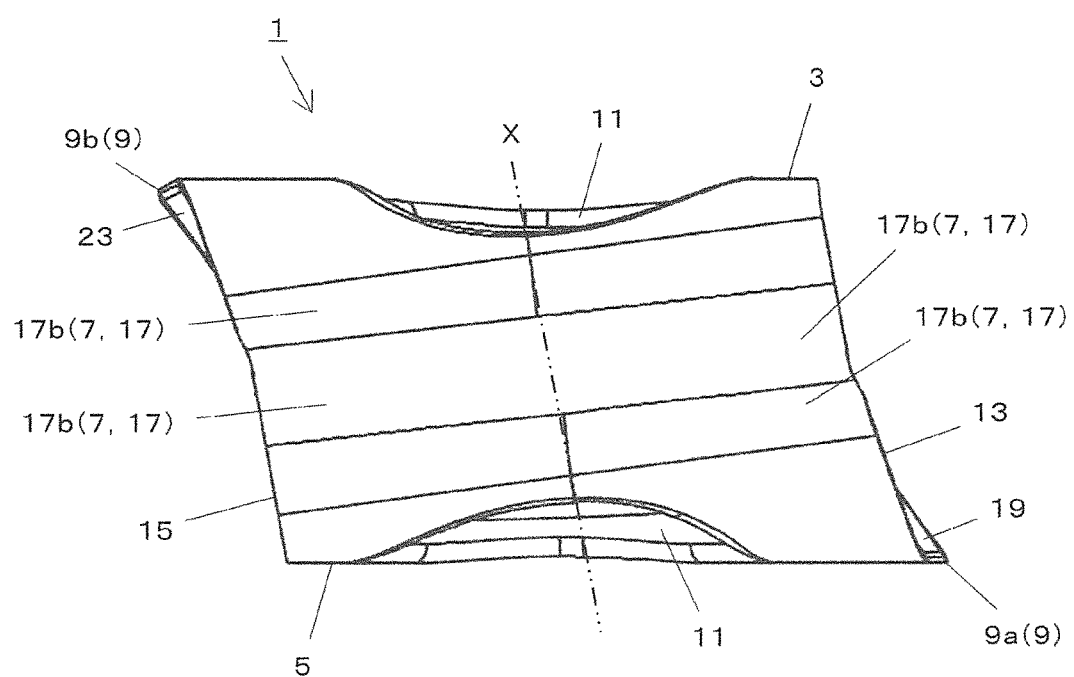
FIG. 7 is a side view of the cutting insert as seen from a direction A4 in FIG. 2.

In a side view as shown in FIG. 5, the first cutting edge 9a protrudes from a ridge line where the upper surface 3 and the front side surface 13 intersect each other, in a direction away from the rear side surface 15, and the second cutting edge 9b protrudes from a ridge line where the lower surface 5 and the rear side surface 15 intersect each other, in a direction away from the front side surface 13. It is noted that in a top view as shown in FIG. 2, a ridge line where the lower surface 5 and the rear side surface 15 intersect each other is made invisible by the upper surface 3, and also, in a bottom view as shown in FIG. 3, a ridge line where the upper surface 3 and the front side surface 13 intersect each other is made invisible by the lower surface 5.

Although a distance between the first cutting edge 9a or the second cutting edge 9b and an opening of the through hole 11 can be widened by tilting the through hole 11 in the above-described manner, a distance between the first cutting edge 9a or the second cutting edge 9b and an opening of the through hole 11 can be widened also by configuring each of the first cutting edge 9a and the second cutting edge 9b so as to protrude as described above. Thus, strength of the insert 1 can be kept high.

As shown in FIG. 2, in a top view of the insert 1 according to the present embodiment, a part of the first cutting edge 9a which protrudes most in a direction away from the rear side surface 15 is labelled as an end part 9aa. Then, as compared to a virtual straight line L5 which passes through a center of the through hole 11 and is parallel to the first horizontal side surface 17a and the second horizontal side surface 17b, the end part 9aa is located closer to the first horizontal side surface 17a.

In carrying out a cutting process using the first cutting edge 9a, the end part 9aa is the first part to come into contact with a workpiece in the first cutting edge 9a. For this reason, a relatively large load is likely to be applied to the end part 9aa in the first cutting edge 9a. At that time, because of the above-described position of the end part 9aa, a thickness of the insert 1 between the end part 9aa and the through hole 11 can be ensured. As a result of this, durability of the first cutting edge 9a can be enhanced.

Also, as shown in FIG. 3, in a top view of the insert 1 according to the present embodiment, a part of the second cutting edge 9b which protrudes most in a direction away from the front side surface 13 is labelled as an end part 9ba. Then, as compared to a virtual line which passes through a center of the through hole 11 and is parallel to the first horizontal side surface 17a and the second horizontal side surface 17b, the end part 9ba is located closer to the first horizontal side surface 17a.

In carrying out a cutting process using the second cutting edge 9b, the end part 9ba is the first part to come into contact with a workpiece in the second cutting edge 9b. For this reason, a relatively large load is likely to be applied to the end part 9ba in the second cutting edge 9b. At that time, because of the above-described position of the end part 9ba, a thickness of the insert 1 between the end part 9ba and the through hole 11 can be ensured. As a result of this, durability of the second cutting edge 9b can be enhanced.

The front side surface 13 according to the present embodiment has a first rake surface 19 and a first flat surface 21. The first rake surface 19 extends along the first cutting edge 9a, and is inclined so as to approach the rear side surface 15 as departing from the first cutting edge 9a. In addition, the first flat surface 21 is located closer to the upper surface 3, as compared to the first rake surface 19. At that time, the first flat surface 21 is formed lying from the first rake surface 19 to a ridge line intersecting the upper surface 3 in the front side surface 13.

Moreover, the rear side surface 15 according to the present embodiment has a second rake surface 23 and a second flat surface 25. The second rake surface 23 extends along the second cutting edge 9b, and is inclined so as to approach the front side surface 13 as departing from the second cutting edge 9b. In addition, the second flat surface 25 is located closer to the lower surface 5, as compared to the second rake surface 23. At that time, the second flat surface 25 is formed lying from the second rake surface 23 to a ridge line intersecting the lower surface 5 in the rear side surface 15.

Each of the upper surface 3 and the lower surface 5 according to the present embodiment functions as a flank surface in a cutting process because each of the front side surface 13 and the rear side surface 15 has a rake surface.

In the insert 1 according to the present embodiment, the first rake surface 19 is formed in the front side surface 13, and the second rake surface 23 is formed in the rear side surface 15. A rake surface serves to scoop chips cut by the cutting edge 9. Because of inclusion of the first rake surface 19 and the second rake surface 23, a chip generated by the first cutting edge 9a and the second cutting edge 9b can be caused to stably flow in the front side surface 13 and the rear side surface 15.

In carrying out a cutting process using the first cutting edge 9a, a cutting force is applied in a direction from the front side surface 13 toward the rear side surface 15. However, the through hole 11 extends from the upper surface 3 to the lower surface 5, so that a screw for fixing the insert 1 to a holder is located so as to extend in a direction orthogonal, not parallel, to a direction in which a cutting force is applied. Thus, the insert 1 can be stably held by not only the rear side surface 15 functioning as a contact surface, but also a screw.

Further, in the insert 1 according to the present embodiment, the first flat surface 21 is formed in the front side surface 13, and the second flat surface 25 is formed in the rear side surface 15. In carrying out a cutting process using the first cutting edge 9a, the rear side surface 15 functions as a contact surface. In carrying out a cutting process using the second cutting edge 9b, the front side surface 13 functions as a contact surface. As the above-described flat surface is formed in each of the front side surface 13 and the rear side surface 15, it is possible to use a flat surface as a contact surface. Accordingly, the insert 1 can be more stably constrained to a holder.

In particular, in the insert 1 according to the present embodiment, no cutting edge is formed on a boundary between the front side surface 13 and the upper surface 3. Thus, as described above, the first flat surface 21 is formed lying from the first rake surface 19 to a ridge line intersecting the upper surface 3 in the front side surface 13. As a result of this, it is possible to secure a large area for the first flat surface 21, so that the insert 1 can be stably fixed to a holder by the first flat surface 21 in a case where the second cutting edge 9b is used.

Similarly, in the insert 1 according to the present embodiment, no cutting edge is formed on a boundary between the rear side surface 15 and the lower surface 5. Thus, as described above, the second flat surface 25 is formed lying from the second rake surface 23 to a ridge line intersecting the lower surface 5 in the rear side surface 15. As a result of this, it is possible to secure a large area for the second flat surface 25, so that the insert 1 can be stably fixed to a holder by the second flat surface 25 in a case where the first cutting edge 9a is used.

It is noted that the front side surface 13 may further have a first land surface (not shown in the drawings) which is located in an outer peripheral edge of the front side surface 13 and is connected with the first cutting edge 9a, in addition to the first rake surface 19 and the first flat surface 21. Similarly, the rear side surface 15 may further have a second land surface (not shown in the drawings) which is located in an outer peripheral edge of the rear side surface 15 and is connected with the second cutting edge 9b, in addition to the second rake surface 23 and the second flat surface 25. To include such land surfaces could enhance strength of the cutting edges 9.

Hereinabove, the cutting insert 1 according to one embodiment of the present invention has been described in detail with reference to the accompanying drawings. However, the cutting insert according to the present invention is not limited to the structure according to the present embodiment.

<Cutting Tool>

Figure 9:
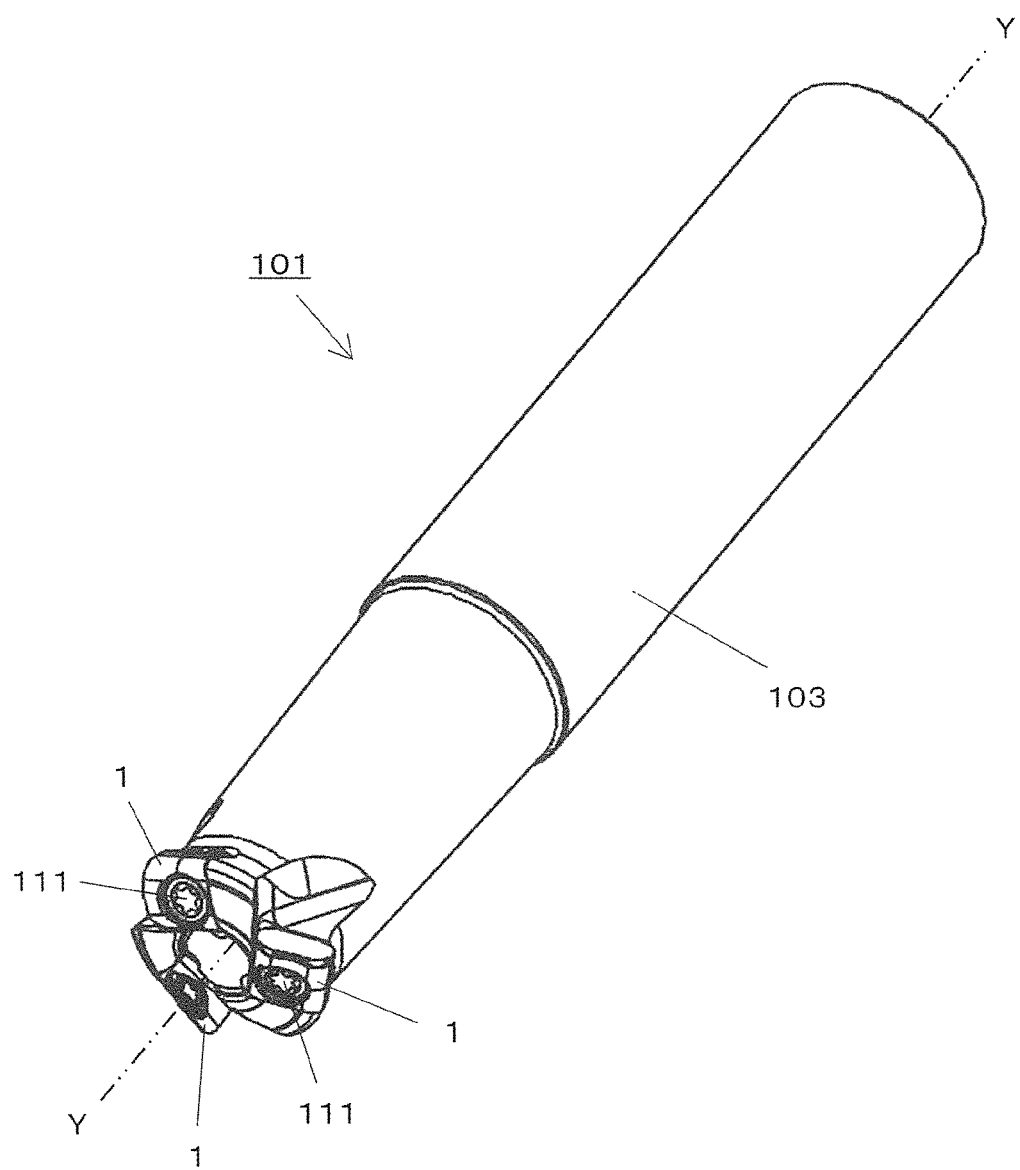
FIG. 9 is a perspective view showing a cutting tool according to one embodiment of the present invention.
Figure 10:
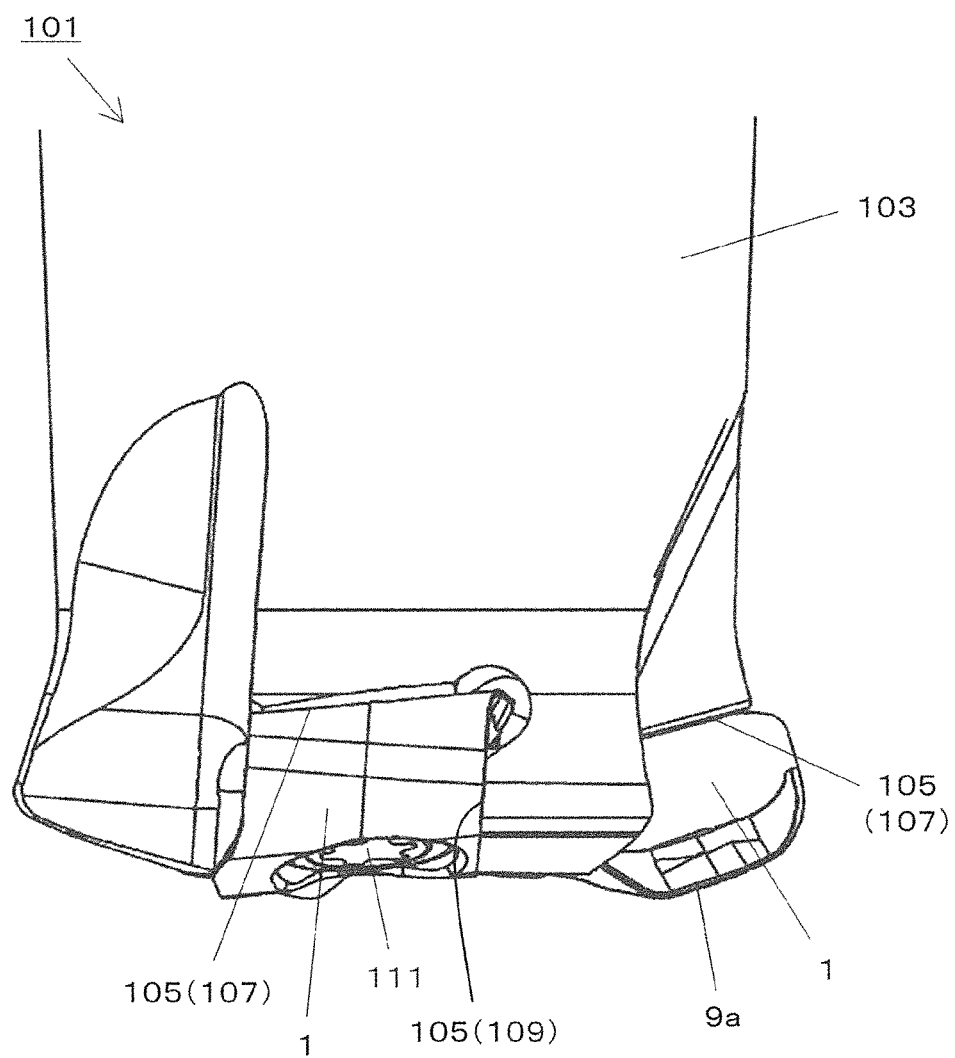
FIG. 10 is an enlarged side view of a tip end of the cutting tool shown in FIG. 9.
Figure 11:
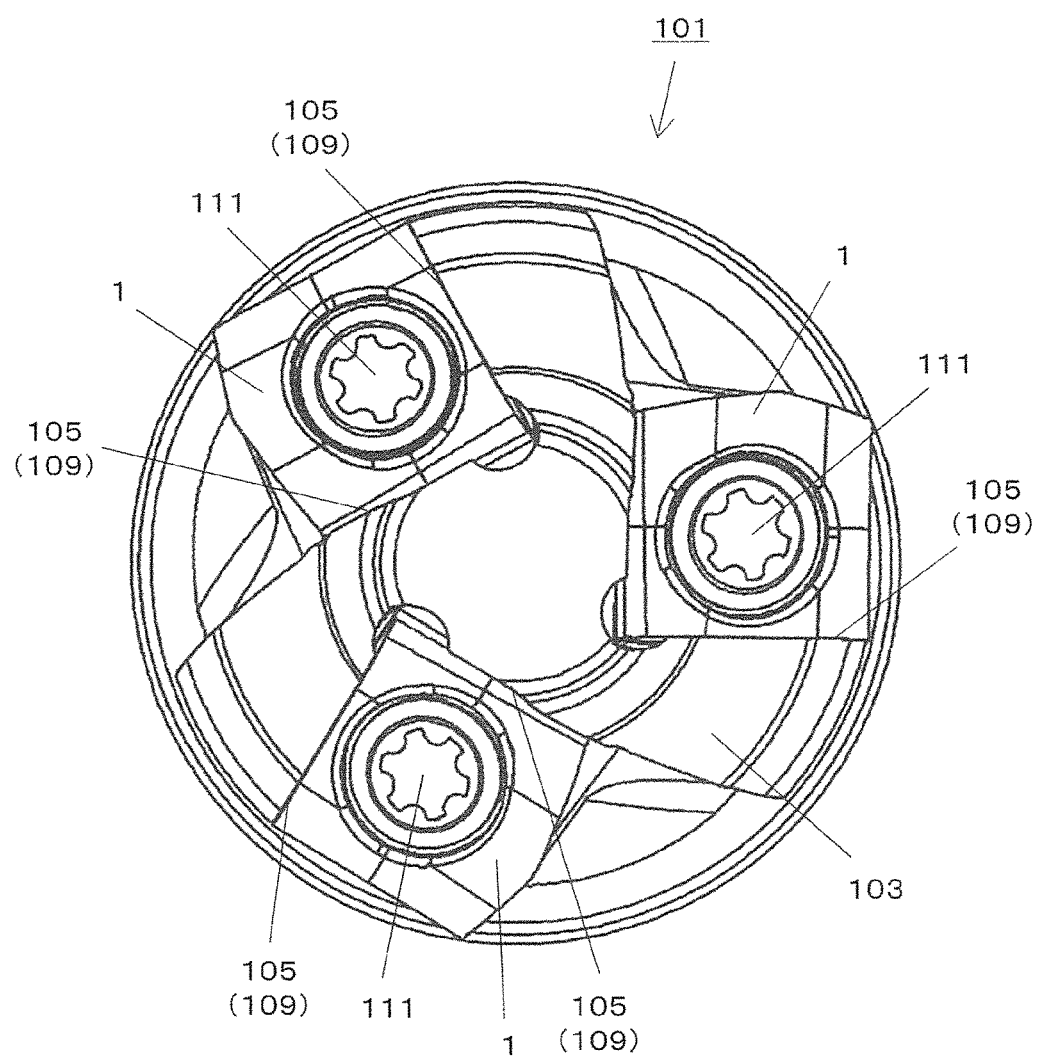
FIG. 11 is a front view of the cutting tool shown in FIG. 9.

Next, a cutting tool 101 according to one embodiment of the present invention will be described with reference to the accompanying drawings. FIGS. 9 to 11 show a state where the insert 1 is attached to an insert pocket 105 (which will also be simply referred to as a "pocket 105") of a holder 103 by a screw 111. It is noted that a chain double-dashed line in FIG. 9 indicates a rotation center axis Y of the cutting tool 101.

The cutting tool 101 according to the present embodiment has a holder 103 having a rotation center axis Y and a plurality of the above-described cutting inserts 1, as shown in FIGS. 9 to 11. The holder 103 has a plurality of insert pockets 105 on an outer peripheral surface of a tip end thereof. The plurality of cutting inserts 1 are respectively attached to the pockets 105.

The holder 103 has a substantially cylindrical shape centered on the rotation center axis Y. Then, on an outer peripheral surface of a tip end of the holder 103, the plurality of pockets 105 are provided while being equally spaced. Each of the pockets 105 is a part to which the cutting insert 1 is attached, and is open at an outer peripheral surface and a tip end surface of the holder 103. More specifically, each of the pockets 105 has a seating surface 107 which is opposite to a rotation direction, and a plurality of constraining side surfaces 109 which are located in a direction intersecting the seating surface 107. Additionally, the plurality of pockets 105 may be provided while being unequally spaced. The holder 101, in which the plurality of pockets 105 are formed, does not have a cylindrical shape in a strict sense.

Then, the cutting insert 1 is attached to each of the plurality of pockets 105 provided in the holder 103. Each of the plurality of cutting inserts 1 is attached in such a manner that the first cutting edge 9a or the second cutting edge 9b protrudes forward from a tip end surface of the holder 103, in other words, protrudes toward a workpiece from a tip end surface of the holder 103.

In a case of attachment in such a manner that the first cutting edge 9a protrudes in a direction of a tip end of the holder 103 in order to use the first cutting edge 9a in a cutting process, each of the upper surface 3, the rear side surface 15, and the first side surface 7 of the insert 1 comes into contact with the pocket 105 as a contact surface. Also, in a case of attachment in such a manner that the second cutting edge 9b protrudes in a direction of a tip end of the holder 103 in order to use the second cutting edge 9b in a cutting process, each of the lower surface 5, the front side surface 13, and the first side surface 7 of the insert 1 comes into contact with the pocket 105 as a contact surface.

According to the present embodiment, the cutting insert 1 is attached to the pocket 105 by the screw 111. More specifically, the screw 111 is inserted into the through hole 11 of the cutting insert 1, and a tip end of the screw 111 is inserted into a screw hole (not shown in the drawings) formed in the pocket 105, to screw the screw parts into each other, so that the insert 1 is attached to the holder 103.

As the holder 103, steel, cast iron, and the like can be used. In the cutting tool 101 according to the present embodiment, steel which has higher toughness among the above materials is used.

<Method of Producing Machined Product>

Figure 12:
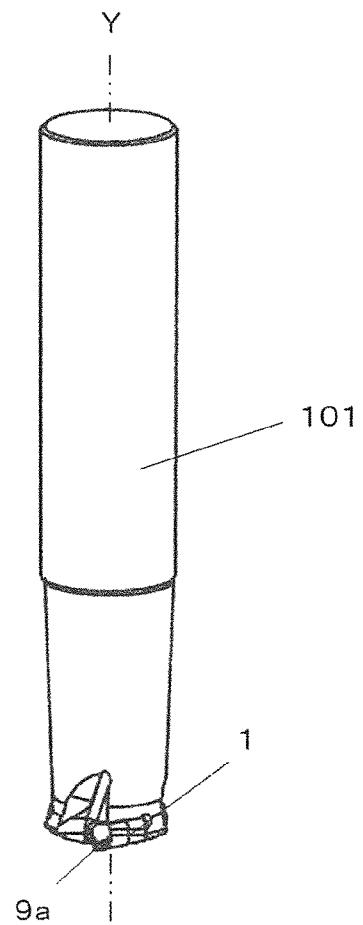
FIG. 12 is a perspective view showing one step in a method of producing a machined product according to one embodiment of the present invention.
Figure 12:
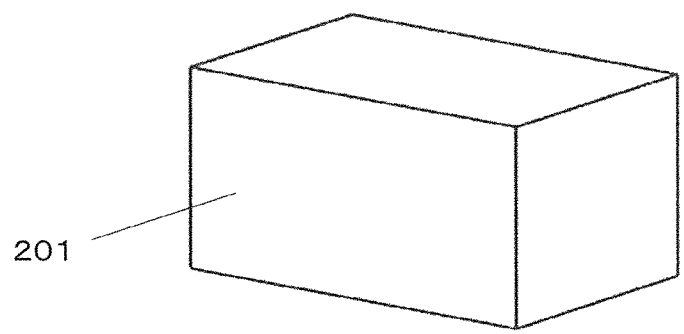
Figure 13:
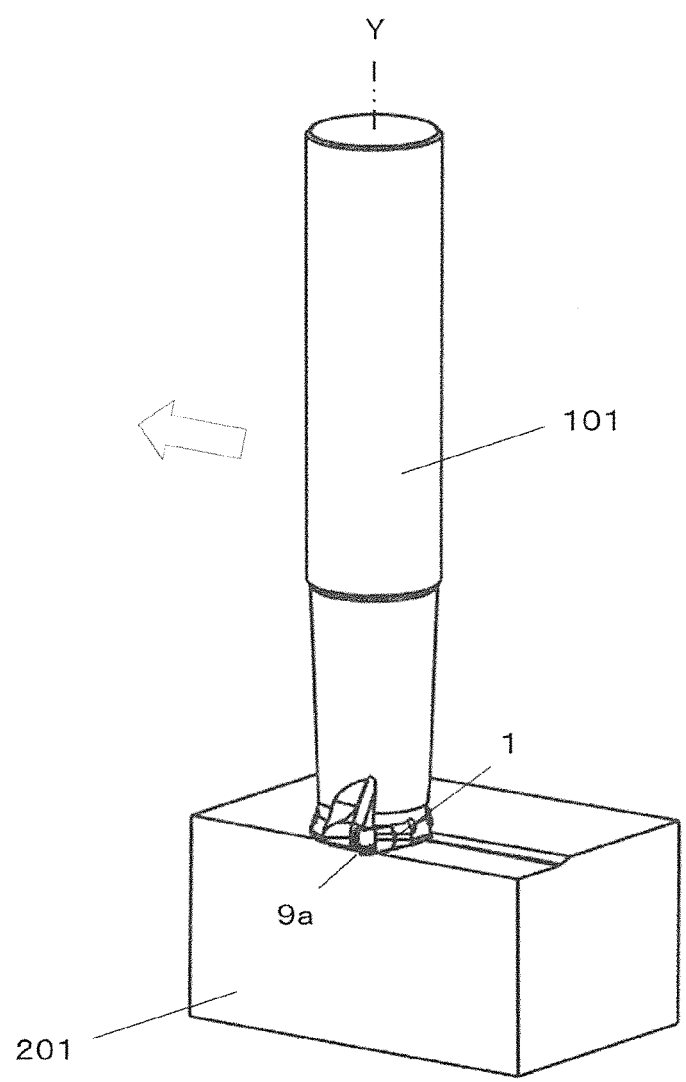
FIG. 13 is a perspective view showing one step in the method of producing a machined product according to one embodiment of the present invention.
Figure 14:
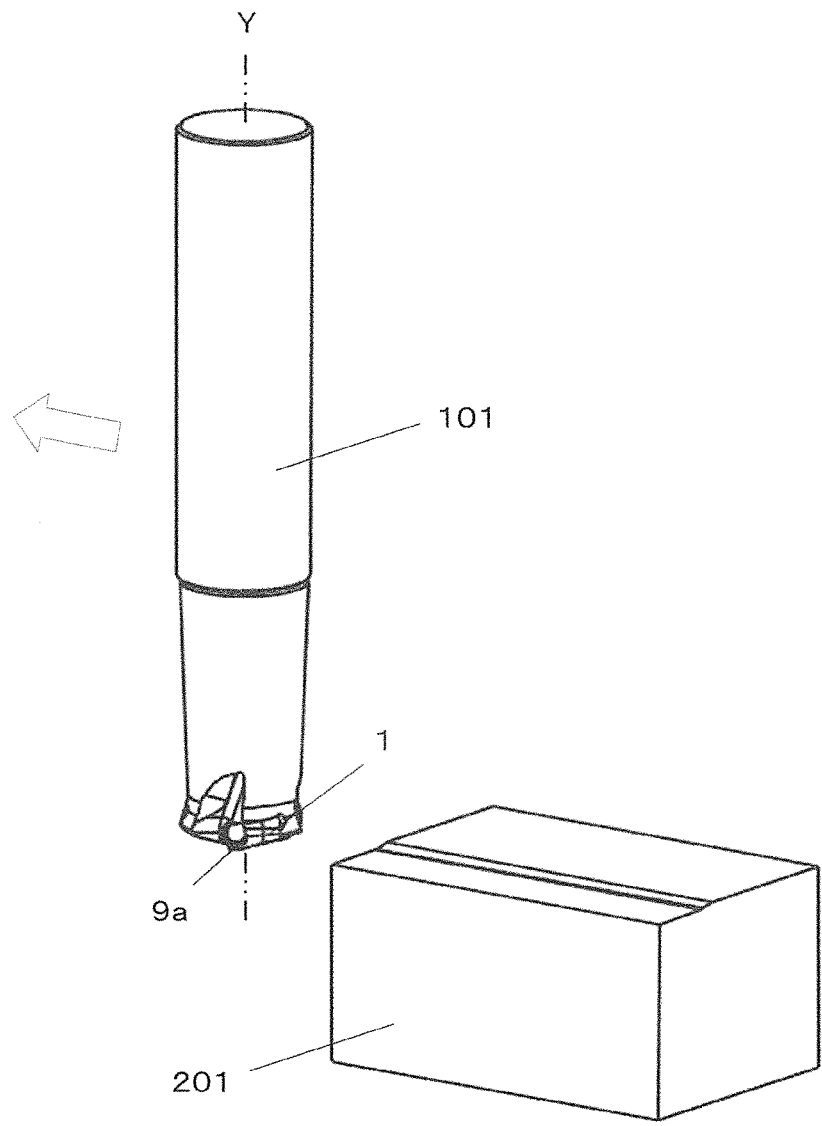
FIG. 14 is a perspective view showing one step in the method of producing a machined product according to one embodiment of the present invention.

Next, a method of producing a machined product according to one embodiment of the present invention will be described with reference to the accompanying drawings. FIGS. 12 to 14 show a method of producing a machined product. A machined product is produced by cutting a workpiece 201. A method of producing a machined product according to the present embodiment has the following steps:

(1) rotating the cutting tool 101 representatively described in the above embodiment;

(2) bringing one of the first cutting edge 9a and the second cutting edge 9b of the cutting tool 101 being rotated, into contact with the workpiece 201; and (3) separating the cutting tool 101 from the workpiece 201.

More specifically, first, as shown in FIG. 12, the cutting tool 101 is rotated about the rotation center axis Y, and the cutting tool 101 is brought close to the workpiece 201. Secondly, one of the first cutting edge 9a and the second cutting edge 9b of the cutting tool 101 is brought into contact with the workpiece 201, to cut the workpiece 201. As shown in FIG. 13, according to the present embodiment, the first cutting edge 9a is brought into contact with the workpiece 201. It is noted that there would be caused no problem if the second cutting edge 9b is used and is brought into contact with the workpiece 201 by reversing the insert 1 and attaching the reversed insert 1 to a holder. Then, as shown in FIG. 14, the cutting tool 101 is separated from the workpiece 201.

According to the present embodiment, the cutting tool 101 is brought close to the workpiece 201 in a state where the workpiece 201 is being fixed and the cutting tool 101 is being rotated about the rotation center axis Y. Also, in FIG. 13, the first cutting edge 9a of the insert 1 which is being rotated is brought into contact with the workpiece 201, to cut the workpiece 201. Further, in FIG. 14, the cutting tool 101 is separated from the workpiece 201 in a state where the cutting tool 101 is being rotated.

It is noted that although, for a cutting process in the method according to the present embodiment, the cutting tool 101 is brought into contact with, or separated from, the workpiece 201 by shifting the cutting tool 101 in each of the steps, the method is not limited to such way, of course.

For example, in the step (1), the workpiece 201 may be brought close to the cutting tool 101. Similarly, in the step (3), the workpiece 201 may be separated from the cutting tool 101. In order to continue a cutting process, a step of bringing the first cutting edge 9a of the insert 1 into contact with a different part of the workpiece 201 is repeated while keeping the cutting tool 101 being rotated.

It is noted that typical examples of a material for the workpiece 201 include carbon steel, alloy steel, stainless steel, cast iron, and nonferrous metal.

REFERENCE SIGNS LIST

1 Cutting insert (insert)
3 Upper surface
5 Lower surface
7 Side surface
9 Cutting edge
9a First cutting edge
9b Second cutting edge
11 Through hole
13 Front side surface
15 Rear side surface
17 Horizontal side surface
17a First horizontal side surface
17b Second horizontal side surface
19 First rake surface
21 First flat surface
23 Second rake surface
25 Second flat surface
101 Cutting tool
103 Holder
105 Insert pocket (pocket)
107 Seating surface
109 Constraining side surface
111 Screw
201 Workpiece

The invention claimed is:

1. A cutting insert comprising:
an upper surface having a substantially rectangular shape;
a lower surface having a substantially rectangular shape;
a side surface which is located between the upper surface and the lower surface, and comprises a front side surface, a rear side surface, and a pair of horizontal side surfaces;
a first cutting edge formed on a first ridge line where the lower surface and the front side surface intersect each other;
a second cutting edge formed on a second ridge line where the upper surface and the rear side surface intersect each other; and
a through hole extending from the upper surface to the lower surface,
wherein an opening of the through hole on a side of the upper surface is provided closer to a third ridge line where the upper surface and the front side surface intersect each other than the second ridge line,
an opening of the through hole on a side of the lower surface is provided closer to a fourth ridge line where the lower surface and the rear side surface intersect each other than the first ridge line, and wherein
the front side surface comprises a first rake surface that extends along the first cutting edge and is inclined so as to approach the rear side surface as departing from the first cutting edge, and
the rear side surface comprises a second rake surface that extends along the second cutting edge and is inclined so as to approach the front side surface as departing from the second cutting edge.

2. The cutting insert according to claim 1, wherein a center axis of the through hole is tilted with respect to the upper surface in such a manner that a part thereof on a side of the upper surface gets close to the rear side surface in a side view as seen from the horizontal side surface.

3. The cutting insert according to claim 1, wherein the first cutting edge protrudes from the third ridge line, in a direction away from the rear side surface in a side view, and
the second cutting edge protrudes from the fourth ridge line, in a direction away from the front side surface in a side view.

4. The cutting insert according to claim 1, wherein the front side surface further comprises a first flat surface which is located closer to the upper surface, as compared to the first rake surface, and
the rear side surface further comprises a second flat surface which is located closer to the lower surface, as compared to the second rake surface.

5. The cutting insert according to claim 1, wherein the first cutting edge has a first end part which is offset from the pair of the horizontal surfaces and protrudes primarily in a direction away from the rear side surface, in a top view.

6. The cutting insert according to claim 5, wherein the first end part is located closer to one of the pair of horizontal side surfaces than the other of the pair of horizontal side surfaces, in a top view.

7. The cutting insert according to claim 6, wherein the second cutting edge has a second end part which protrudes most in a direction away from the front side surface, in a top view.

8. The cutting insert according to claim 7, wherein the second end part is located closer to one of the pair of horizontal side surfaces than the other of the pair of horizontal side surfaces, in a top view.

9. A cutting tool comprising:
a holder having a plurality of insert pockets at a tip end thereof; and
a cutting insert according to claim 1, which is attached to one of the plurality of insert pockets in such a manner that one of the first cutting edge and the second cutting edge protrudes in a direction of the tip end of the holder.

10. A method of producing a machined product, comprising:
rotating a cutting tool according to claim 9;
bringing one of the first cutting edge and the second cutting edge of the cutting tool being rotated, into contact with a workpiece; and
separating the cutting tool from the workpiece.

11. A cutting insert comprising:
an upper surface having a substantially rectangular shape;
a lower surface having a substantially rectangular shape;
a side surface which is located between the upper surface and the lower surface, and comprises a front side surface, a rear side surface, and a pair of horizontal side surfaces;
a first cutting edge formed on a first ridge line where the lower surface and the front side surface intersect each other;
a second cutting edge formed on a second ridge line where the upper surface and the rear side surface intersect each other; and
a through hole extending from the upper surface to the lower surface,
wherein an opening of the through hole on a side of the upper surface is provided closer to a third ridge line where the upper surface and the front side surface intersect each other than the second ridge line, an opening of the through hole on a side of the lower surface is provided closer to a fourth ridge line where the lower surface and the rear side surface intersect each other than the first ridge line, and wherein a center axis of the through hole is tilted with respect to the upper surface in such a manner that a part thereof on a side of the upper surface gets close to the rear side surface in a side view as seen from the horizontal side surface, and the center axis is parallel to the pair of horizontal side surfaces.

12. The cutting insert according to claim 11, wherein a width between the opening of the through hole on a side of the upper surface and one of the pair of horizontal side surfaces is larger than a width between the opening of the through hole on a side of the upper surface and the other of the pair of horizontal side surfaces in a top view.

* * * * *